(12) United States Patent
Jorgensen et al.

(10) Patent No.: US 8,993,692 B2
(45) Date of Patent: Mar. 31, 2015

(54) SELF LIMITING CATALYST COMPOSITION FOR ETHYLENE POLYMERIZATION

(75) Inventors: Robert J. Jorgensen, Scott Depot, WV (US); Sean W. Ewart, Pearland, TX (US); Richard E. Campbell, Jr., Midland, MI (US); Daryoosh Beigzadeh, Midland, MI (US); Robert D. Froese, Midland, MI (US); Peter M. Margl, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 138 days.

(21) Appl. No.: 13/700,503

(22) PCT Filed: Jun. 29, 2011

(86) PCT No.: PCT/US2011/042378
§ 371 (c)(1),
(2), (4) Date: Jan. 30, 2013

(87) PCT Pub. No.: WO2012/003219
PCT Pub. Date: Jan. 5, 2012

(65) Prior Publication Data
US 2013/0131289 A1 May 23, 2013

Related U.S. Application Data

(60) Provisional application No. 61/360,408, filed on Jun. 30, 2010.

(51) Int. Cl.
| | | |
|---|---|---|
| C08F 4/649 | (2006.01) | |
| C08F 2/34 | (2006.01) | |
| C08F 10/02 | (2006.01) | |
| C08F 110/02 | (2006.01) | |
| C08F 210/16 | (2006.01) | |

(52) U.S. Cl.
CPC .............. *C08F 110/02* (2013.01); *C08F 210/16* (2013.01)
USPC ............... 526/65; 526/74; 526/110; 526/141; 526/142; 526/348.2; 526/348.5

(58) Field of Classification Search
USPC ........ 526/65, 110, 141, 142, 74, 348.2, 348.5
See application file for complete search history.

(56) References Cited

U.S. PATENT DOCUMENTS

| | | | |
|---|---|---|---|
| 3,232,919 A | | 2/1966 | Shearer, Jr. et al. |
| 4,368,305 A | * | 1/1983 | Tanaka et al. .................. 526/116 |
| 5,126,398 A | * | 6/1992 | Lee et al. ......................... 525/53 |
| 2006/0068984 A1 | | 3/2006 | Sugano |

FOREIGN PATENT DOCUMENTS

| | | |
|---|---|---|
| EP | 1 183 284 | 3/2002 |
| WO | WO 2009/088701 | 7/2009 |

OTHER PUBLICATIONS

EP Instructions to Office Action dated Jun. 13, 2013; from EP counterpart Application No. 11730523.5.
EP Response to Office Action dated Jun. 28, 2013; from EP counterpart Application No. 11730523.5.
International Preliminary Report on Patentability dated Dec. 31, 2012; from PCT Application No. PCT/US2011/042378.
EP Office Action dated Feb. 14, 2013; from EP counterpart Application No. 11 730 523.5.
Chinese Office Action dated Aug. 4, 2014; from Chinese counterpart Application No. 201180041988.0.

* cited by examiner

*Primary Examiner* — Fred M Teskin

(57) ABSTRACT

A process for polymerizing ethylene to produce an ethylene-based polymer including contacting ethylene with a Ziegler-Natta procatalyst, an alkylaluminum cocatalyst and a self limiting agent selected from the group of aliphatic, cycloaliphatic, substituted cycloaliphatic or aromatic esters, anhydrides and amides such that the self limiting agent reduces polymerization rates to no greater than 40% of the polymerization rate in the absence of the self limiting agent at temperatures equal to or greater than 120° C. is provided.

9 Claims, 3 Drawing Sheets

FIG. 6

SELF LIMITING CATALYST COMPOSITION FOR ETHYLENE POLYMERIZATION

BACKGROUND OF THE INVENTION

The present invention relates to Ziegler-Natta type catalyst compositions for use in the polymerization of ethylene and mixtures of ethylene with one or more C4-C8 α-olefins having improved high temperature polymerization properties. More particularly, the present invention relates to such catalyst compositions that are self-limiting or auto-extinguishing, thereby avoiding polymer agglomeration, operability problems, and/or reactor sheeting, chunking or fouling due to localized overheating.

Catalysts which produce broad molecular weight distributions and high molecular weight tails are desirable for use in both slurry and gas phase polymerization processes, to produce improved products, especially HDPE blow molding resins, where resin swell (caused by high molecular weight chains) is important. However, the production of these polymers with very high molecular weight resin fractions, has been difficult due to reactor operability issues.

Gas phase polypropylene (PP) and polyethylene (PE) polymerization processes are highly exothermic, generating large amounts of heat as the polymerization occurs. One feature of a catalyst system utilized in these polymerization processes is known as "activation energy" and governs the rate at which the polymerization reaction proceeds as the polymerization temperature increases. Catalyst systems in which the rate increases are said to have "positive activation energy", where the rate decreases, "negative activation energy".

In a gas phase polymerization process, the polymerization reactor is cooled by the circulating monomer gasses to maintain a steady operating temperature. However, if the temperature of a growing resin particle approaches the sticking/melting point of the resin, resin sheeting on the reactor walls may occur. Growing resin particles are especially susceptible to overheating if they accumulate at the reactor walls, thereby losing heat-transfer with the circulating monomer gasses, and remaining in close contact with respect to each other. In such instances, particle-particle fusion may occur, followed by reactor sheeting, which, in turn, could cause reactor shutdown.

Catalyst systems to minimize or prevent reactor sheeting have been developed for use in propylene polymerization reactions. Such catalyst systems possess mitigating chemical features (e.g., temperature-dependent decomposition of an attached ligand to give a poison) which shut down polymerization when the temperature becomes excessive. That is, such systems result in a negative activation energy, slowing down the polymerization reaction as reaction temperature increases. Alternative known systems use one or more reagents external to the catalyst composition, commonly referred to as Self Limiting Agents (SLA), to slow or deactivate the polymerization reaction. SLAs have been used successfully in propylene polymerization and co-polymerization reactions; for example, SLAs described U.S. Pat. Nos. 7,678, 868, 7,381,779 and 7,491,670. The operating temperature for PP polymerization is 65 to 80° C., and the melting point of the resin is about 165° C., giving an 85 to 100° C. temperature span in which an SLA may operate. Generally, polypropylene SLAs shut down the polymerization reaction at an active site when the temperature of the active site reaches about 90° C.

SLAs, however, have not previously been used successfully in two-stage ethylene polymerization or copolymerization reactions or single stage ethylene polymerization reactions operating at high polymerization temperatures. For a two-stage PE process, the polymerization temperatures are about 75 to 95° C. in the first reactor and between 100° C. and 112° C. in the second reactor, while the melting point of the PE resin produced is about 125-135° C. and the sticking temperature, i.e. the temperature at which granular particles begin to adhere to each other, is about 120 to 125° C. For a single stage process, particularly one producing high density polyethylenes, the reaction temperature will also be greater than 100° C. to as high as 112° C. Thus, for such PE polymerization reactions, there is only a 15-25° C. temperature span in which SLAs may function. The use of SLAs are further complicated in two-stage PE polymerization reactions utilizing catalyst that form a very high molecular weight fraction. Specifically, catalysts used in such PE reactions may contain both titanium-based and hafnium and/or zirconium-based active sites or multiple sites based on titanium. The hafnium, zirconium and titanium active sites of the PE catalysts exhibit differing sensitivity to poisoning further complicating the use of SLAs in PE reactions. For example, U.S. Pat. No. 7,393,910 discloses the use of an alkyl or aryl ester of an aliphatic or aromatic carboxylic acid as a self limiting agent for a single-stage polyethylene polymerization. The disclosed esters poison active catalyst sites at temperatures between 90-100° C. and, therefore, would not be useful in producing PE in a two-stage reactor system.

Thus, there remains a need for an SLA for use in two-stage PE reactions, and particularly for use in production of PE with high molecular weight fractions, which deactivates the PE polymerization reaction at temperatures greater than 112° C. and preferably completely deactivating the catalyst at temperatures greater than 125° C. A need further exists for such SLAs which do not impact the properties of the resulting polymer. In particular, there is a need for an SLA which does not negatively impact the formation or properties of the high molecular weight fraction of PE produced in a two-stage reactor.

SUMMARY OF THE INVENTION

One aspect of the invention provide a process for polymerizing ethylene comprising (i) contacting, in at least a first reactor, ethylene; optionally at least one comonomer; with a catalyst composition comprising one or more Group 3-10 transition metal containing Ziegler-Natta procatalyst compounds; one or more alkylaluminum cocatalysts; and one or more self limiting agents, wherein the one or more self limiting agents are selected from the group of aliphatic, cycloaliphatic, substituted cycloaliphatic or aromatic esters, anhydrides and amides and the one or more self limiting agents are provided at a total self limiting agent to transition metal component molar ratio from 0.25:1 to 10:1 such that the self limiting agents reduce polymerization rates to no greater than 40% of the polymerization rate in the absence of the one or more self limiting agents at temperatures equal to or greater than 125° C.; and (ii) polymerizing at a first reactor temperature of greater than 75° C. and less than 112° C. to form an ethylene-based polymer.

In certain embodiments, the first reactor is a gas phase or slurry, or parallel polymerization reactor of gas or slurry phase.

In certain embodiments, the first reactor is connected serially to at least one second reactor in which additional polymerization occurs at a second reactor temperature of greater than 75° C. and less than 112° C. to form an ethylene-based polymer.

In another embodiment, polymerization catalyst is fed only to the first reactor of the reactors in series and the SLA is likewise fed only to the first reactor in the series.

In some embodiments of the inventive process provides the substantial elimination of sheeting in the first reactor.

In one embodiment of the invention, the one or more self limiting agents is 4-methylcyclohexane-1,2-dicarboxylic anhydride and is present in the first reactor at a molar ratio to transition metal component of about 1:1 to 1.9:1.

In another embodiment of the invention, the one or more self limiting agents is 4-methylcyclohexane-1,2-dicarboxylic anhydride and is present in the first reactor at a molar ratio to transition metal component of about 2:1 to 10:1.

In certain specific embodiments of the inventive process, the one or more self limiting agents is dihydro-2H-pyran-2,6 (3H)-dione; 4-methylcyclohexane-1,2-dicarboxylic anhydride; or a combination thereof.

In some embodiments of the inventive process, the Ziegler Natta procatalyst compound that comprises titanium and hafnium or titanium and/or zirconium and wherein the one or more self limiting agents does not selectively deactivate hafnium or zirconium active sites.

In another aspect of the invention, the inventive process further comprises polymerizing the ethylene-based polymer in a second reactor at a temperature of about 112° C.

Yet another aspect of the invention is a polymer produced according to the inventive process, the polymer comprising one or more reaction products of the one or more self limiting agents.

In some embodiments, the polymer comprises a high molecular weight fraction.

Another aspect of the invention provides an improvement to two-stage gas phase polymerization process for producing an ethylene-based polymer comprising a high molecular weight fraction, the improvement comprising adding one or more self limiting agents to a first stage reactor wherein the one or more self limiting agents are selected from the group of aliphatic, cycloaliphatic, substituted cycloaliphatic or aromatic esters, anhydrides and amides and the one or more self limiting agents are added at a total self limiting agent to Ti molar ratio from 0.5:1 to 10:1 such that the one or more self limiting agents reduce catalyst activity to no greater than 40% of the catalyst activity in the absence of the one or more self limiting agents at temperatures equal to or greater than 120° C.

DETAILED DESCRIPTION OF EMBODIMENTS OF THE INVENTION

One aspect of the invention provides a method of minimizing or eliminating reactor sheeting in a two-stage polyethylene polymerization which produces a polyethylene having a high molecular weight fraction, the method comprising introducing one or more self limiting agents.

Another aspect of the invention provides a method of minimizing or eliminating reactor sheeting in single stage polyethylene polymerizations which produce a polyethylene having high reactor static potential, the method comprising introducing one or more self limiting agents.

Embodiments of the invention provide methods utilizing self-limiting agents which do not affect catalyst productivity at temperatures as high as 112° C. but which deactivate the catalyst at temperatures equal to or greater than 120° C.

Another aspect of the invention provides self limiting agents which do not selectively poison active Hf, Zr, or Ti catalyst sites.

Another aspect of the invention utilizes self limiting agents which, while minimizing or eliminating reactor wall sheeting, do not modify the physical properties of the PE resin in comparison to those of PE resins produced in the absence of the self limiting agent.

Embodiments of the invention provide the use of self limiting agents in staged reactors which rapidly deactivate PE catalysts at temperatures greater than the second reactor temperature and less than the melting point of the PE resin.

Yet another aspect of the invention provides a PE resin produced using the inventive process. In some aspects of the invention, the PE resin produced using the inventive process comprises a reaction product of the self limiting agent(s).

In some aspects of the invention, the self limiting agent is mixed with and introduced into the reactor with a cocatalyst feed. In alternative embodiments of the invention, the self limiting agent is introduced into the reactor separately from the cocatalyst feed to the reactor.

In some embodiments of the invention, the self limiting agent is an ester, anhydride, amide or combination thereof.

In some embodiments, the introduction of the self limiting agent results in the deactivation of the polymerization catalyst at temperatures below the PE polymer softening temperature.

In embodiments of the invention, the self limiting agent is selected from the group of aromatic, aliphatic, cycloaliphatic, and substituted cycloaliphatic anhydrides and amides, including, by way of example and not limitation, 3-methylbenzoic acid diethylamide, 1-octyl-2-pyrrolidone, 1-dodecanoylpyrrolidine, 1-vinyl-2-pyrrolidinone, dihydro-2H-pyran-2,6(3H)-dione, 1-methyl-2-pyrrolidinone, 1-methyl-2-quinolone, and 4-methylcyclohexane-1,2-dicarboxylic anhydride.

In another aspect of the inventive method of minimizing or eliminating reactor sheeting in a polyethylene polymerization which produces a polyethylene having a high molecular weight fraction, the method consisting essentially of introducing one or more self limiting agents.

In yet another aspect of the inventive method, a process for polymerizing ethylene consisting essentially of: (i) contacting, in a first reactor, ethylene; optionally at least one comonomer; with a catalyst composition comprising one or more Group 3-10 transition metal containing Ziegler-Natta procatalyst compounds; one or more alkylaluminum cocatalysts; and one or more self limiting agents, wherein the one or more self limiting agents are selected from the group of aliphatic, cycloaliphatic, substituted cycloaliphatic or aromatic anhydrides and amides and the one or more self limiting agents are provided at a total self limiting agent to transition metal component molar ratio from 0.25:1 to 10:1 such that the self limiting agents reduce polymerization rates to no greater than 40% of the polymerization rate in the absence of the one or more self limiting agents at temperatures equal to or greater than 120° C.; and (ii) polymerizing at a first reactor temperature of greater than 75° C. and less than 112° C. to form an ethylene-based polymer, is provided.

Yet another aspect of the invention provides an improvement for a two-stage gas phase polymerization process for producing an ethylene-based polymer comprising a high molecular weight fraction, the improvement consisting essentially of adding one or more self limiting agents to a first stage reactor where the one or more self limiting agents are selected from the group of aliphatic, cycloaliphatic, substituted cycloaliphatic or aromatic anhydrides and amides and the one or more self limiting agents are added at a total self limiting agent to Ti molar ratio from 1:1 to 10:1 such that the one or more self limiting agents reduce catalyst activity to no greater than 40% of the catalyst activity in the absence of the one or more self limiting agents at temperatures equal to or greater than 120° C.

Specific Ziegler-Natta type catalysts are described in U.S. Patent Publication No. 20070060725 which describes suitable catalysts containing multiple transition metals and PCT Patent Publication No. WO2010017393 which describes suitable catalysts containing multiple polymerization sites based on titanium, both of which are incorporated herein by reference. In an especially preferred embodiment, the specific feature shared by the catalysts useful in the invention is the inclusion of Zr and/or Hf active sites, to produce the high molecular weight portion of the polymer.

The preferred polymers are those in which the presence of a high molecular weight fraction is advantageous, that is, resins designed for blow molding applications, pipe, blown films, and the like, where a higher degree of resin swell or melt strength is desired for efficient processing. The process is applicable to production of polymers that contain a measurable fraction of very high molecular weight species of molecular weight greater than $10^6$ g/mol, or $10^7$ g/mol or greater, with mass fraction greater than 1 percent by weight, alternatively greater than 2 percent by weight, or, alternatively, greater than or equal to 4 percent by weight. Such polymers are described in PCT Publication No. WO2009085922, the disclosure of which is incorporated herein by reference.

Other preferred polymers are those that tend to generate high levels of reactor static that draw catalyst particles to the wall of a fluidized bed reactor leading to wall sheeting since these particles are now poorly fluidized and catalyst rich. Typical polymers are high molecular weight low and medium density polymers with density ranging from 0.915 to 0.940 g/cc and Melt Index ($I_2$) values between 0.2 and 1 dg/min. Embodiments of the invention are of particular use for polymerizations in which trimethylaluminum is used as cocatalyst.

Gas phase reaction systems equivalent to that described in U.S. Pat. No. 5,527,752, WO2009088701 and WO2009085922, the disclosures of which are incorporated herein by reference, are useful in embodiments of the invention. Embodiments of the invention may alternatively be conducted using a high throughput, parallel polymerization reactor (PPR) operated substantially according to U.S. Pat. Nos. 6,248,540, 6,030,917, 6,362,309, 6,306,658, and 6,316,663, the disclosures of which are incorporated herein by reference.
Definitions Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application.

Numerical ranges have been recited, as discussed herein, in reference to density, melt index, weight percent of component and other properties.

The term "polymer" is used herein to indicate, a homopolymer, a copolymer, or a terpolymer. The term "polymer" as used herein includes interpolymers, such as, for example, those made by the copolymerization of ethylene with C3-C10 alpha olefins, or propylene with ethylene and/or C4-C 10 alpha olefins.

The term "ethylene-based polymer," as used herein, refers to a polymer that comprises at least a majority mole percent ethylene (based on total amount of polymerized monomer), and, optionally, one or more additional comonomers. Comonomers useful in the inventive process include C3-C20 olefins, preferably α-olefins, including, for example, propylene, 1-butene, 1-pentene and 1-hexene.

The terms "catalyst" and "catalyst composition" as used herein, refer to transition metal compounds, or mixtures thereof, that are useful in catalyzing the polymerization of addition polymerizable monomers, generally in combination with one or more cocatalysts or activator compounds. Preferred catalysts are mixtures or complexes of non-metallocene transition metal compounds and magnesium compounds, such as magnesium chloride compounds, alternatively referred to as Ziegler Natta catalysts or Ziegler Natta type catalysts.
Test Methods Melt flow rate measurements for the ethylene-based polymers were performed according to ASTM D-1238-04, Condition 190° C./2.16 kg, Condition 190° C./5 kg and Condition 190° C./21.6 kg, which are known as $I_2$, $I_5$ and $I_{21}$, respectively. To homogenize the samples prior to measurement, resins from the high molecular weight reactor of the at least two reactors in series is first roll milled with stabilizer (2000 ppm by weight of butylated hydroxyl toluene) then cut into strips for use in the analysis. Resins from the subsequent reactor(s) in the series are first melt compounded into pellets for homogenization purposes and then used in the analysis. Melt flow rate is inversely proportional to the molecular weight of the polymer. Thus, the higher the molecular weight, the lower the melt flow rate, although the relationship is not linear. Melt Flow Ratio (MFR) is the ratio of melt flow rate ($I_{21}$) to melt flow rate ($I_2$), unless otherwise specified.

Resin samples produced using batch reactors had melt flow properties measured using the aforementioned ASTM standards without the additional homogenization steps.

Resin density was measured by the Archimedes displacement method, ASTM D 792-00, Method B, in isopropanol. Specimens were measured within one hour of molding, after conditioning in the isopropanol bath at 23° C., for 8 minutes, to achieve thermal equilibrium prior to measurement. The specimens were compression molded according to ASTM D-4703-00, Annex A, with a five minutes initial heating period at about 190° C., and a 15° C./min cooling rate per Procedure C. The specimen was cooled to 45° C. in the press, with continued cooling until "cool to the touch."

Titanium, aluminum and hafnium residuals were measured as ppm by wt using X-ray Diffraction techniques with appropriate standards.

Titanium residue is normalized to a 3 hour residence time and 70 psi ethylene partial pressure using the following formula for the catalyst utilized in the examples herein:
Ti ppm$_{normalized}$=Ti ppm$_{measured}$*($C_2H_4$ PSI/70)*(RT/3)
(Note that RT=Residence Time). The catalyst used in the examples has a first order dependency of ethylene on catalyst productivity and a decay rate of <0.2 hr$^{-1}$.

Particle size was measured using a standard set of mesh sieves—10/18/35/60/120/200/pan and calculated using the mass of resin retained on each sieve.

Fines are defined as resin particles passing through the 120 mesh screen and calculated as the % mass of resin retained.

INVENTIVE EXAMPLES AND COMPARATIVE EXAMPLE

Sheeting is not generally observed in the second reactor of a two-stage PE polymerization systems. Each of the inventive self limiting agents was tested in a batch reactor under conditions mimicking the temperature of: (1) a first gas-phase reactor (i.e., 85° C.); (2) a second gas-phase reactor (i.e., 110 to 112° C.); and (3) under a first gas-phase reactor condition exhibiting runaway reaction (i.e., 125° C.). Polymerization runs were performed at 85° C. and 125° C. with a $H_2$:$C_2$ molar ratio of 0.4 and at 110° C. with a $H_2$:$C_2$ molar ratio of 0.9.

In each case, a comparison was made to a standard run under the same conditions with no self limiting agent present. All batch reactor experiments were performed in a 600 ml Parr batch reactor. Under an inert atmosphere the reactor was loaded with 200 ml hexane, 1 ml 1-hexene comonomer and 125 micromoles of triethylaluminum (TEA) cocatalyst. The reactor was stirred at 500 rpm and heated to the desired temperature. Upon reaching the set temperature 2.5 micromoles Ti of a procatalyst catalyst in a tetradecane slurry and prepared as described in catalyst example 3 of WO2009088701, the disclosure of which is incorporated herein by reference, was added. The reactor was pressurized with hydrogen and ethylene at the desired levels initiating the polymerization. During the polymerization the temperature was controlled to within 2° C. of the setpoint with an external cooling bath or electric heater. The pressure was maintained at the desired setpoint by feeding ethylene on demand. After 30 minutes the reaction was stopped by cooling the reactor to below 30° C. and venting off the ethylene pressure. The resulting polymer was collected by filtration and dried in a vacuum oven.

Testing at 85° C.

Figure 1:
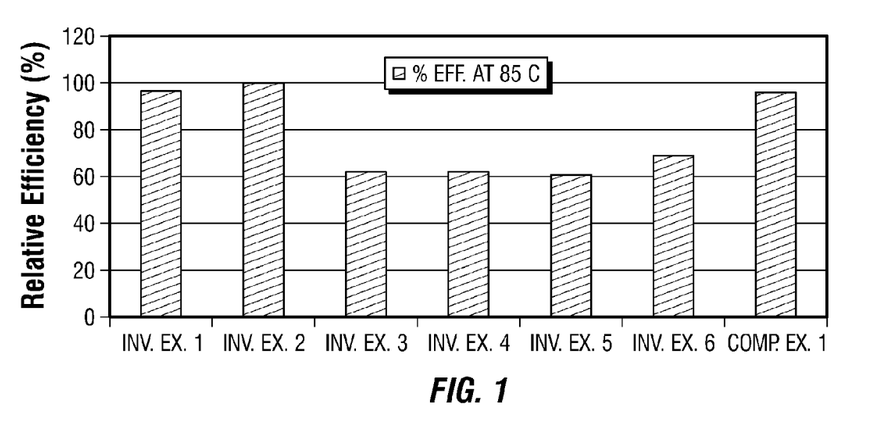
FIG. 1 is a chart illustrating the effect at 85° C. on polymerization yield of comparative example 1 and inventive examples 1-6 when added with cocatalyst and when added with procatalyst.

Inventive Examples 1-6, utilizing the self limiting agents as identified in Table 1, were tested in two different manners in the batch reactor. The self limiting agent was added into the reactor with the cocatalyst feed, prior to addition of the catalyst solution to the reactor. The batch reactor was operated at 85° C. and under first reactor conditions described in WO2009088701 and WO2009085922, the disclosures of which are incorporated herein by reference. The reaction yields for each of Inv. Exs. 1-6, as a percentage of batch reaction without addition of a self limiting agent (the "Standard" or "Std."), are shown in FIG. 1. The SLA:Ti molar ratio used for each Inventive Example is provided in Table 2.

TABLE 1

| Self Limiting Agent | Inventive Example |
|---|---|
| Dihydro-2H-pyran-2,6(3H)-dione | 1 |
| 4-methylcyclohexane-1,2-dicarboxylic anhydride | 2 |
| 1-methyl-2-pyrrolidinone | 3 |
| 1-vinyl-2-pyrrolidinone | 4 |
| 1-octyl-2-pyrrolidone | 5 |
| 1-dodecanoylpyrrolidine | 6 |

As can be seen in FIG. 1, Inv. Exs. 1-2 resulted in catalyst efficiencies >80% of Std.

Comparative Example 1 was produced using tetrahydrofuran (THF) as the self limiting agent in a THF:Ti molar ratio of 5:1. For Comparative Example 1 the THF was added into the polymerization reactor with the catalyst.

The resulting polyethylene (PE) polymer produced using self limiting Inv. Exs. 1-6 in the 85° C. batch reactor were evaluated by melt flow measurements, as given in Table 2. As shown in Table 2, the PE polymers produced using Inv. Exs. 1-6, at 85° C., and the Standard Examples showed no significant differences in $I_2$, $I_{21}$ or $I_{21}/I_2$. PE produced using the self limiting agents of Inv. Exs. 1-2 exhibit slightly increased $I_{21}/I_2$ which may indicate some enhancement of the high molecular weight fraction.

TABLE 2

| Sample | Inv. Ex. 1 | Inv. Ex. 2 | Inv. Ex. 3 | Inv. Ex. 4 | Inv. Ex. 5 | Inv. Ex. 6 | Comp. Ex. 1 | Std. |
|---|---|---|---|---|---|---|---|---|
| SLA:Ti molar ratio | 5 | 2 | 2 | 1 | 2.5 | 2.5 | 5 | 0 |
| $I_2$ (dg/min) | 0.171 | 0.488 | 0.363 | 0.468 | 0.45 | 0.745 | 1.448 | 0.596 |
| $I_{21}$ (dg/min) | 12.25 | 25.8 | 16.14 | 19.02 | 20.73 | 31.59 | 46.67 | 28.34 |
| MFR ($I_{21}/I_2$) | 71.63 | 52.85 | 44.52 | 40.65 | 46.09 | 42.42 | 32.23 | 47.55 |

Testing at 125° C.

Figure 2:
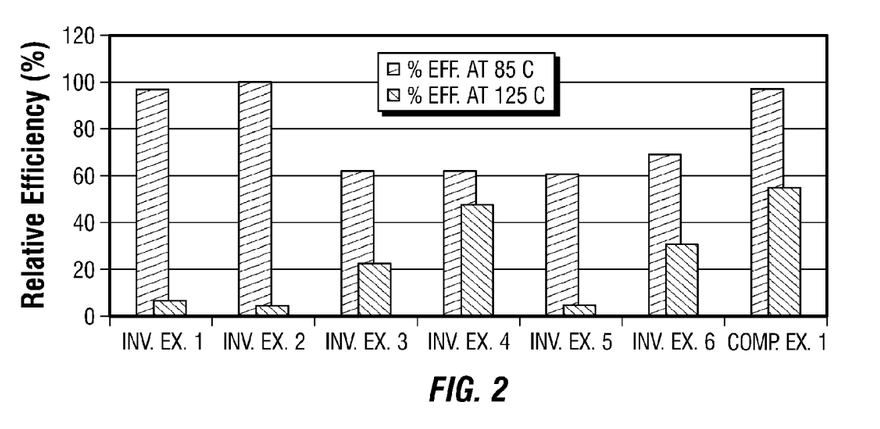
FIG. 2 is a chart illustrating the effect at 125° C. on polymerization yield of comparative example 1 and inventive examples 1-6 when added with cocatalyst.

Inventive examples 1-6 were also used in batch polymerizations at 125° C. under first reactor conditions described in WO2009088701 and WO2009085922, the disclosures of which are incorporated herein by reference. The reaction yields for each of Inv. Exs. 1-8, as a percentage of batch reaction without addition of a self limiting agent (the "Standard" or "Std."), for both the 85° C. and 125° C. testing are shown in FIG. 2.

Inventive Examples 1-3, and 5 each resulted in >60% relative activity at 85° C. and less than 40% relative activity at 125° C. These Inventive Examples were then tested at 110° C. Testing at 110° C.

Figure 3:
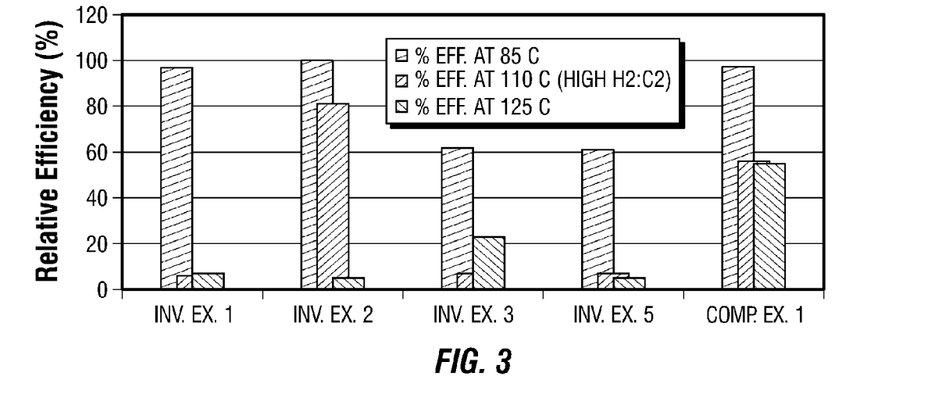
FIG. 3 is a chart illustrating the effect at 110° C. on polymerization yield of comparative example 1 and inventive examples 1-6 when added with cocatalyst.

Inventive Examples 1-3 and 5 were then used as self limiting agents in a batch reactor at conditions mimicking the second reactor in a two-stage gas phase PE polymerization process, namely 110° C. and at conditions described for a second reactor in WO2009088701 and WO2009085922, the disclosures of which are incorporated herein by reference. The results for the runs at 110° C. are shown in FIG. 3. Inventive Example 2 displays an overall optimum activity for a two-stage polyethylene self limiting agent. Table 3 illustrates the effect of Inventive Example 2,4-methylcyclohexane-1,2-dicarboxylic anhydride, as a self limiting agent. Specifically, Inv. Ex. 2 did not significantly negatively impact reactivity at first or second reactor conditions but did provide substantial deactivation at the PE resin melting point temperature under first reactor conditions. Other Inventive Examples may be optimally useful in single stage reactors, such as Inventive Example 1 which exhibits near complete catalyst activity at 85° C. and effective catalyst poisoning at temperatures equal to or greater than 110° C.

TABLE 3

| Temperature | Catalyst activity in the absence of Inv. Ex. 2 (4-methylcyclohexane-1,2-dicarboxylic anhydride) | Catalyst activity in the presence of 5 μmol Inv. Ex. 2 (4-methylcyclohexane-1,2-dicarboxylic anhydride) | % of standard activity |
|---|---|---|---|
| 85 | 21948 | 21992 | 100.2 |
| 110 | 30300 | 25000 | 82.5 |
| 125 | 41386 | 2144 | 5.2 |

* catalyst activity reported as g PE/(mmol Ti * 100 psiC2 * hr)

Single Reactor Testing

Inventive Examples 1 and 2 were further tested in a single gas phase reactor under the first reactor conditions described above. The SLA was fed directly into the polymerizing bed in solution—Inv. Ex. 2 was dissolved in isopentane and Inv. Ex. 1 was dissolved in hexane. The SLA solutions were fed to directly into the polymerizing bed and the rate of SLA solution feed was adjusted to achieve the desired SLA/Ti mole ratio of 2:1 ratio for Inv. Ex. 2 and a 5:1 ratio for Inv. Ex. 1.

Figure 4:
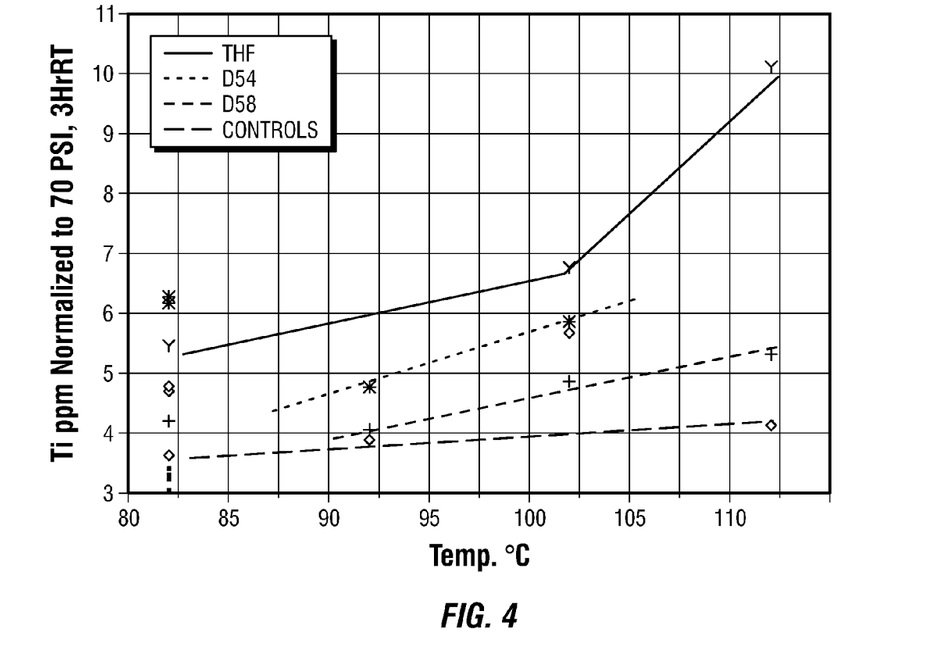
FIG. 4 is a chart of Titanium residual in ppm by weight in the final resin normalized to 70 psi ethylene partial pressure and a 3 hr residence time as a function of temperature for Inventive Examples 1-2 and Comparative Example 1 used in a single gas phase reactor.
Figure 5:
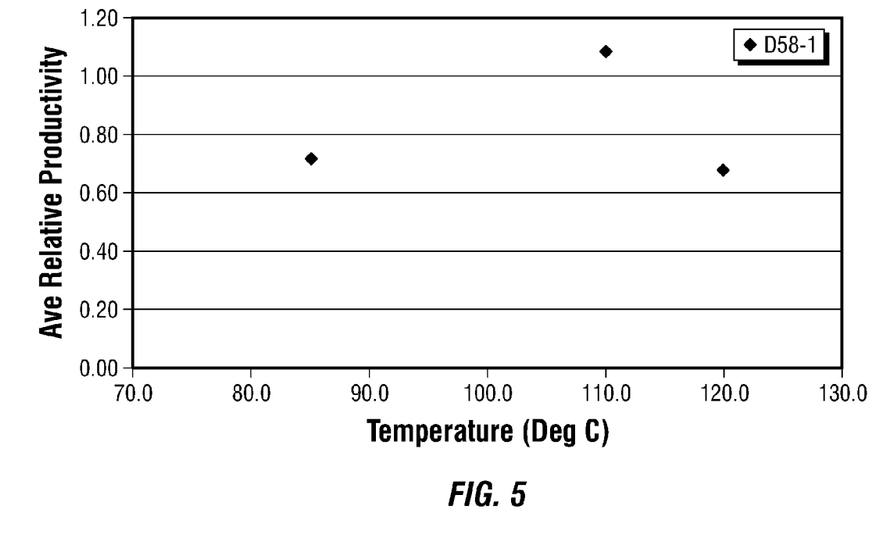
FIG. 5 is a chart illustrating the average relative productivity of catalyst in presence of Inventive Example 2 at 85, 110 and 125° C. and an SLA:Ti molar ratio of 1:1.
Figure 6:
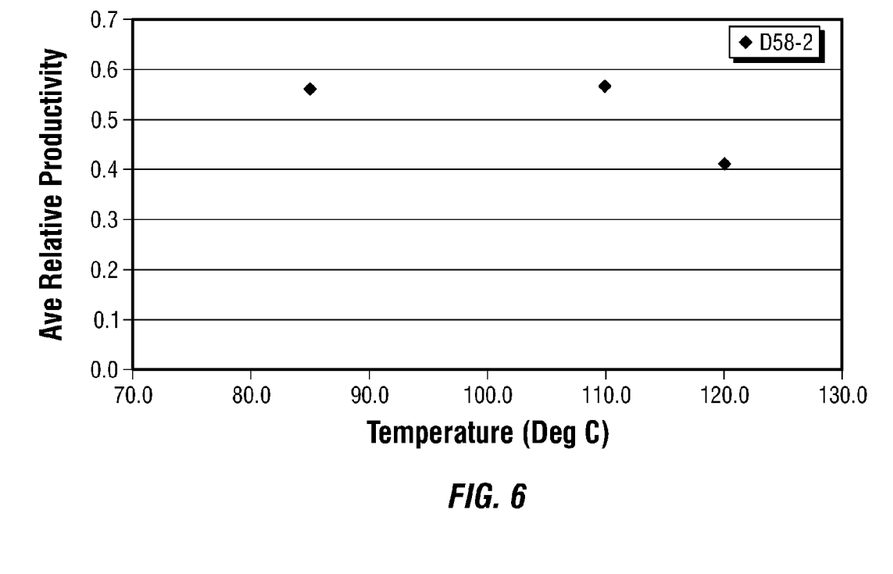
FIG. 6 is a chart illustrating the average relative productivity of catalyst in presence of Inventive Example 2 at 85, 110 and 125° C. and an SLA:Ti molar ratio of 2:1.

The reactor was started up at 82° C. under first reactor conditions described in WO2009088701 and WO2009085922, the disclosures of which are incorporated herein by reference to produce first reactor PE resin. The temperature was then slowly raised in 10° C. increments and the ethylene partial pressure adjusted to keep the production rate approximately constant (the other first reactor conditions such as comonomer: ethylene and hydrogen:ethylene mole ratios remained essentially constant as temperature increased). FIG. 4 illustrates the Titanium residual in ppm by weight in the final resin normalized to 70 psi ethylene partial pressure and a 3 hr residence time. Increased Ti concentration is symbolic of decreased catalyst activity. Table 4 provides the polymerization reaction conditions and resin properties for the single gas phase polymerization using Inv. Ex. 1 and Table 5 provides the polymerization reaction conditions and resin properties for the single gas phase polymerization using Inv. Ex. 2. In each of Tables 4-5, the Continuity Aid a 50/50 by weight mixture of aluminum distearate and AS-990 (a methoxylated amine) fed as a 20 wt % slurry in HB-380 mineral oil (available from Crompton Corporation, now Chemtura Corporation). Static Range: Band width of static observed during the experiment; residence time is calculated by dividing Bed Weight by production rate; and production rate is determined by weight of resin produced/hour.

TABLE 4

|  | Std. | Inv. Ex. 1 - Run 1 | Inv. Ex. 1 - Run 2 | Inv. Ex. 1 - Run 3 | Inv. Ex. 1 - Run 4 |
|---|---|---|---|---|---|
| REACTION CONDITIONS | | | | | |
| Temp. ° C. | 82.0 | 82.0 | 82.0 | 91.9 | 102.0 |
| Inlet Temp | 80.1 | 81.3 | 80.7 | 90.3 | 101.0 |
| Pressure, psig | 347.9 | 347.9 | 348.0 | 348.0 | 347.9 |
| $C_2$ Part. Pressure, psi | 70.0 | 80.5 | 79.9 | 83.9 | 94.0 |
| $H_2/C_2$ Molar Ratio | 0.0950 | 0.0945 | 0.0953 | 0.0945 | 0.0950 |
| $C_6/C_2$ Molar Ratio | 0.0123 | 0.0123 | 0.0124 | 0.0122 | 0.0123 |
| Continuity Aid Feed (cc/hour)# | 1.000 | 1.000 | 1.000 | 1.000 | 1.000 |
| Bed Weight, lbs | 152.4 | 152.2 | 151.3 | 152.8 | 153.2 |
| Bed Height | 7.9 | 7.9 | 7.9 | 8.1 | 7.6 |
| alkyl type | TEAL | TEAL | TEAL | TEAL | TEAL |
| SLA Feed (cc/hour of 0.5% solution) | 0.0 | 143.8 | 67.9 | 68.1 | 65.6 |
| Production Rate | 33.2 | 31.3 | 31.1 | 35.2 | 31.3 |
| Residence Time, hr | 4.60 | 4.87 | 4.86 | 4.34 | 4.89 |
| Static Range volts | 35.83 | 50.00 | 26.67 | 42.50 | 35.00 |
| SGV (ft/sec) | 1.6 | 1.6 | 1.5 | 1.5 | 1.4 |
| RESIN PROPERTIES | | | | | |
| $I_{21}$ | 0.69 | 0.37 | 0.46 | 0.76 | 2.59 |
| Density, g/cm$^3$ | 0.9371 | 0.9358 | 0.9368 | 0.9375 | 0.9416 |
| Titanium ppmw | 3.08 | 3.37 | 3.34 | 2.75 | 2.80 |
| Al ppm | 35.3 | 75.0 | 64.2 | 68.8 | 39.5 |
| Al/Ti | 20.3 | 39.6 | 34.3 | 44.5 | 26.1 |
| Bulk Density, lb/ft$^3$ | 25.2 | 25.0 | 25.9 | 26.2 | 26.8 |
| Fines, Wt % LT 120 Mesh | 1.9 | 2.0 | 2.1 | 2.8 | 2.4 |

TABLE 4-continued

|  | Std. | Inv. Ex. 1 - Run 1 | Inv. Ex. 1 - Run 2 | Inv. Ex. 1 - Run 3 | Inv. Ex. 1 - Run 4 |
|---|---|---|---|---|---|
| D10, Microns | 161 | 170 | 151 | 142 | 157 |
| D50, Microns | 555 | 585 | 552 | 564 | 674 |
| D90, Microns | 1306 | 1307 | 1303 | 1322 | 1411 |
| Span | 2.06 | 1.94 | 2.09 | 2.09 | 1.86 |
| Ti ppm Normalized to 70 PSI, 3 Hr RT | 4.72 | 6.28 | 6.18 | 4.77 | 6.13 |

TABLE 5

|  | Std. | Inv. Ex. 2 - Run 1 | Inv. Ex. 2 - Run 2 | Inv. Ex. 2 - Run 3 | Inv. Ex. 2 - Run 4 |
|---|---|---|---|---|---|
| REACTION CONDITIONS |  |  |  |  |  |
| Temp. °C. | 82.0 | 82.0 | 92.0 | 102.0 | 112.0 |
| Inlet Temp | 80.5 | 80.6 | 91.4 | 101.5 | 112.0 |
| Pressure, psig | 347.8 | 347.9 | 347.8 | 348.0 | 347.9 |
| $C_2$ Part. Pressure, psi | 70.0 | 70.3 | 70.9 | 79.9 | 89.6 |
| $H_2/C_2$ Molar Ratio | 0.0872 | 0.0917 | 0.0934 | 0.0934 | 0.0933 |
| $C_6/C_2$ Molar Ratio | 0.0128 | 0.0125 | 0.0121 | 0.0121 | 0.0120 |
| Continuity Aid Feed (cc/hour) | 1.000 | 1.000 | 1.000 | 1.000 | 1.000 |
| Bed Weight, lbs | 149.6 | 152.8 | 152.8 | 153.9 | 153.8 |
| Bed Height | 7.3 | 8.2 | 8.4 | 8.1 | 7.6 |
| alkyl type | TEAL | TEAL | TEAL | TEAL | TEAL |
| SLA Feed (cc/hour of 0.5% solution) | 0.0 | 104.0 | 105.1 | 105.0 | 104.9 |
| Production Rate | 33.3 | 36.1 | 34.0 | 35.0 | 34.7 |
| Residence Time, hr | 4.50 | 4.24 | 4.49 | 4.40 | 4.44 |
| Static Range volts | 30.00 | 36.67 | 35.83 | 32.50 | 50.00 |
| SGV (ft/sec) | 1.6 | 1.6 | 1.6 | 1.6 | 1.5 |
| RESIN PROPERTIES |  |  |  |  |  |
| $I_{21}$ | 0.587 | 0.5 | 0.6 | 1.4 | 4.6 |
| Density, g/cm$^3$ | 0.9369 | 0.9372 | 0.9376 | 0.9389 | 0.9415 |
| Titanium ppmw | 3.18 | 2.97 | 2.67 | 2.92 | 2.81 |
| Al ppm | 35.9 | 39.6 | 44.4 | 40.3 | 30.0 |
| Al/Ti | 20.1 | 23.6 | 29.9 | 24.6 | 19.0 |
| Bulk Density, lb/ft$^3$ | 25.2 | 25.4 | 26.1 | 26.7 | 29.4 |
| Fines, Wt % LT 120 Mesh | 1.5 | 2.0 | 3.6 | 4.1 | 5.0 |
| D10, Microns | 182 | 169 | 142 | 138 | 126 |
| D50, Microns | 616 | 570 | 557 | 529 | 479 |
| D90, Microns | 1347 | 1316 | 1314 | 1315 | 1310 |
| Span ((D90 − D10/D50) | 1.89 | 2.01 | 2.10 | 2.23 | 2.47 |
| Ti ppm Normalized to 70 PSI, 3 Hr RT | 4.77 | 4.22 | 4.06 | 4.88 | 5.32 |

Inventive Example 2 was further tested in a parallel polymerization reactor (a/k/a parallel pressure reactor or PPR) using the Symyx PPR® system. The catalyst, as described above, was delivered as ~30 wt % slurries in mineral oil, isolated by washing ~1 gm of solid with hexane (3×30 ml), and dried under vacuum at room temperature for 2 hours. Slurries were made up in toluene and concentrations prepared containing 0.225 mmoles of catalyst such that 200 μl of the slurry would be injected into PPR to initiate polymerization. The PPR was used to evaluate the self limiting behavior of a selection of self limiting agents.

Copolymerizations of ethylene and 1-octene were carried out at 85, 110 and 120° C. at 150 psig with a hydrogen/ethylene (0.25) mixture and Isopar E solvent, a blend of aliphatic hydrocarbons with a normal boiling point range of 113 to 139° C. (available from ExxonMobil Chemical Co.). The reactors were loaded with TIBA and the appropriate solvent level to give a final total volume of 5 mls, heated to desired temperature and then pressurized to 150 psig. To each cell was added 100 μl of 0.5 Molar 1-octene in toluene, the SLA solution with a SLA/Ti ratio of between 0-15 followed by the catalyst (45 nmols) in toluene (capped with 50 μl of solvent) at which time the reaction timer was started. Each addition was followed with 500 μl of solvent to ensure the complete injection of the reagent. The polymerization experiments were carried out to 80 psi ethylene uptake or 50 minutes. The polymerizations reactions were quenched with the introduction of 150 psi of 10% $CO_2$ in argon. The reactors were cooled down to 50° C. and vented and the polymer samples were removed and dried. Gel permeation chromatography was used to determine the molecular weights of the polymer samples. Multiple runs were conducted and the average results of the PPR polymerizations are shown in Table 6.

TABLE 6

| Sample | SLA:Ti Molar Ratio | Temp. (° C.) | Ave. Productivity (kilograms polymer/gram catalyst) | Ave. Relative Productivity | Ave. $M_n$ | Ave. $M_w$ | Ave. $M_w/M_n$ |
|---|---|---|---|---|---|---|---|
| Inv. Ex. 2 | 2 | 85 | 4.24 | 0.561 | 65443 | 520221 | 7.95 |
| | | 110 | 12.55 | 0.565 | 47179 | 217894 | 4.62 |
| | | 120 | 9.83 | 0.409 | 37106 | 146604 | 3.95 |
| Std. | 0 | 85 | 7.57 | 1 | 606062 | 543460 | 9.25 |
| | | 110 | 22.23 | 1 | 40577 | 172524 | 4.24 |
| | | 120 | 24.02 | 1 | 36403 | 138075 | 3.80 |
| Inv. Ex. 2 | 1 | 85 | 4.78 | 0.72 | 52319 | 430576 | 8.19 |
| | | 110 | 22.48 | 1.09 | 42659 | 168852 | 3.96 |
| | | 120 | 15.02 | 0.68 | 34971 | 136897 | 3.91 |
| Std. | 0 | 85 | 6.63 | 1 | 57062 | 419618 | 7.37 |
| | | 110 | 20.70 | 1 | 39257 | 154119 | 3.93 |
| | | 120 | 22.05 | 1 | 31915 | 123667 | 3.88 |

We claim:

1. A process for polymerizing ethylene comprising: (i) contacting, in a first reactor, ethylene; optionally at least one comonomer; with a catalyst composition comprising one or more Group 3-10 transition metal containing Ziegler-Natta procatalyst compounds, one or more alkylaluminum cocatalysts; and one or more self limiting agents, wherein the one or more self limiting agents are selected from the group of consisting dihydro-2H-pyran-2,6(3H)-dione; 4-methylcyclohexane-1,2-dicarboxylic anhydride; and a combination thereof and the one or more self limiting agents are provided at a total self limiting agent to transition metal component molar ratio from 0.25:1 to 10:1 such that the self limiting agents reduce polymerization rates to no greater than 40% of the polymerization rate in the absence of the one or more self limiting agents at temperatures equal to or greater than 120° C.; and (ii) polymerizing at a first reactor temperature of greater than 75° C. and less than 112° C. to form an ethylene-based polymer.

2. The process of claim 1 wherein the first reactor is a gas phase or slurry, or parallel polymerization reactor of gas or slurry phase.

3. The process of claim 1 wherein the first reactor does not exhibit sheeting.

4. The process of claim 3 wherein the one or more self-limiting agents is 4-methylcyclohexane-1,2-dicarboxylic anhydride and is present in the first reactor at a molar ratio to transition metal component of about 0.5:1 to 1.9:1.

5. The polymer produced according to claim 1, the polymer comprising one or more reaction products of the one or more self limiting agents.

6. The process of claim 1, wherein the ethylene-based polymer comprises a high molecular weight fraction.

7. The process of claim 1, further comprising polymerizing the ethylene-based polymer in a second reactor at a temperature of about 112° C.

8. The process of claim 1 wherein the Ziegler Natta procatalyst compound comprises hafnium and wherein the one or more self limiting agents does not selectively deactivate hafnium active sites.

9. In a two-stage gas phase polymerization process for producing an ethylene-based polymer comprising a high molecular weight fraction, the improvement comprising adding one or more self limiting agents to a first stage reactor wherein the one or more self limiting agents are selected from the group consisting of dihydro-2H-pyran- 2,6(3H)-dione; 4-methylcyclohexane-1,2-dicarboxylic anhydride; and a combination thereof and the one or more self limiting agents are added at a total self limiting agent to Ti molar ratio from 0.5:1 to 10:1 such that the one or more self limiting agents reduce catalyst activity to no greater than 40% of the catalyst activity in the absence of the one or more self limiting agents at temperatures equal to or greater than 120° C.

* * * * *